United States Patent [19]
Yoshioka et al.

[11] Patent Number: 5,042,155
[45] Date of Patent: Aug. 27, 1991

[54] IMAGE FORMING MEMBER DRIVE DEVICE OF AN AUTOMATIC DRAWING APPARATUS

[75] Inventors: Masaki Yoshioka; Kenji Nakai; Kenji Watanabe; Takaharu Yamamoto; Takeji Hashimoto, all of Kyoto, Japan

[73] Assignee: Dainippon Screen Mfg. Co., Ltd., Japan

[21] Appl. No.: 306,646

[22] Filed: Feb. 3, 1989

[30] Foreign Application Priority Data

Feb. 5, 1988 [JP] Japan .................. 63-26360

[51] Int. Cl.⁵ .................................. G01D 15/24
[52] U.S. Cl. .................. 33/18.1; 346/139 R; 33/32.3
[58] Field of Search ............ 33/18.1, 18.2, 18.3, 33/20.1, 20.2, 32.3, 32.4; 346/139 R, 139 C

[56] References Cited

U.S. PATENT DOCUMENTS

| | | | |
|---|---|---|---|
| 3,753,384 | 8/1973 | Anfindsen | 33/18.1 |
| 3,864,695 | 2/1975 | Nagashima et al. | 346/139 R |
| 3,956,588 | 5/1976 | Whetstone et al. | |
| 4,015,269 | 3/1977 | Edo | 33/18.1 |
| 4,091,393 | 5/1978 | Masuyama et al. | 33/18.1 |
| 4,135,245 | 1/1979 | Kemplin et al. | |
| 4,324,047 | 4/1982 | Roch | 33/18.1 |
| 4,430,660 | 2/1984 | Araki | 346/139 R |
| 4,527,108 | 7/1985 | Enda | 346/139 R |
| 4,683,476 | 7/1987 | Ferrari et al. | 346/139 R |
| 4,825,555 | 5/1989 | Murayama et al. | 33/18.1 |

FOREIGN PATENT DOCUMENTS

3417040A1 11/1985 Fed. Rep. of Germany .

*Primary Examiner*—William A. Cuchlinski, Jr.
*Assistant Examiner*—William C. Dowling
*Attorney, Agent, or Firm*—Ostrolenk, Faber, Gerb & Soffen

[57] ABSTRACT

An image forming member, e.g. a pen or a cutter (for cutting image patterns), which member requires to be lowered onto and applied with a given pressure to a writing surface, is controlled in two modes. In a position control mode, the image forming member is controlled by means of a closed loop circuit by which it is lowered and positioned at a very small distance off of the writing surface. In accordance with a second, pressure control mode, the image forming member is controlled by means of an open loop circuit. With the aid of the open loop circuit the member is lowered and then applied with a given pressure to the writing surface. Thus, accurate and rapid controlling of such an image forming member is achieved.

9 Claims, 6 Drawing Sheets

IMAGE FORMING MEMBER DRIVE DEVICE OF AN AUTOMATIC DRAWING APPARATUS

BACKGROUND OF THE INVENTION

1. Field of the Invention

The present invention relates to a device for driving an image forming member (such as a pen or a clipping cutter) in an automatic drawing apparatus and particularly to a driving device of an automatic drawing apparatus for controlling the raising and lowering of the image forming member or an image forming pressure.

2. Description of the Background Art

A drive for an image forming member of interest to the present invention is disclosed for example in Japanese Utility Model Laying-Open No. 66534/1974 or Japanese Patent Laying-Open No. 148696/1984.

In both of the above indicated documents, the image forming member of the automatic drawing apparatus is coupled to a moving coil and it is driven vertically through control of the magnitude of current flowing in the moving coil.

According to the first document (No. 66534/1974), the magnitude of the current flowing at the time of lowering or raising the image forming member of the automatic drawing apparatus, connected to the moving coil is controlled in the following manner. When a lowering in the speed of the image forming member is detected (by detection of a quantity of light and by differentiation of a signal of the detected light quantity according to that document), the magnitude of the current that should flow in the coil is determined by subtracting the value of current which is dependent on the lowering speed from a predetermined value of current which should flow in the coil. In other words, the decrease in speed of the image forming member is detected and the value of current is controlled so that the speed is equal to a predetermined value. Thus, closed loop control is carried out solely by detecting the speed. As a result, the image forming member is allowed to soft-land on a sheet where the image is formed.

According to the second of the aforementioned document, the magnitude of the current flowing in the moving coil connected to the image forming member of the automatic drawing apparatus is controlled in an open loop by using a function generating circuit. When the image forming member is to be lowered, it is first accelerated to be lowered. The lowering speed is decreased before the image forming member reaches the image formation surface and, after that, the image forming member is stopped. Then, the image forming member is accelerated a little so that it may soft-land on the image formation sheet. After that, a predetermined pressure is applied to the image forming member to form an image through the above mentioned soft-landing, contacting of the image forming member with the image formation sheet occurs without causing any impact or damage.

More specifically, the image forming member is lowered at high speed toward the image formation sheet so as to be close thereto and is then soft-landed on the image formation sheet. As a result, any impact or damage on the image formation sheet which would be caused by the image forming member can be prevented and an image is formed with fine traces on the image formation sheet.

Generally, in an automatic drawing apparatus, the image forming member needs to be operated accurately and smoothly so as to prevent the image forming member from causing any damage and to form an image of fine lines. For those purposes, it is necessary to control the magnitude of current flowing in the moving coil connected with the image forming member accurately and smoothly. This is because the image forming member is driven in proportion to the current flowing in the moving coil based on the Flemings' left-hand rule.

The automatic drawing apparatus of the above indicated first conventional example has a speed detector for detecting a speed of the image forming member but this detector detects only the lowering speed of the image forming member. The lowering speed of the image forming member is controlled according to the detected value so that the image forming member is soft-landed on the surface of the image formation sheet. This prior art example involves disadvantages. It is possible that the lowering time or the landing point of the image forming member will differ in dependence on the distance from the image forming member to be lowered to the surface of the image formation sheet. Accordingly, the image forming member might collide with the image formation sheet or become bound thereon. Consequently, the life of the image forming member would be considerably reduced or that fine traces might not be obtained.

According to the second of the above indicated prior art example, the steps of raising and lowering the image forming member are controlled in an open loop. Accordingly, the stop position of the image forming member is not fixed stably compared with the closed loop control system. Consequently, the same disadvantages as in the case of the first example are present. In order to eliminate such disadvantages, it is necessary to adjust a drive control device for each drawing apparatus and such adjustment requires a lot of labor.

In each of the two examples, a current of a prescribed value is caused to flow in the moving coil after the image forming member has landed on the image formation sheet. As a result, the image forming member is pressed against the image formation sheet with a prescribed pressure. However, if a knife or similar cutter is used as the image formation member and a peel off film is used as the image formation sheet, the below described problems occur. If the peel off film is to be cut by using the knife, it is necessary to set the pressure on the knife to between 10 to 20 grams. When the peel off film is cut with such a very weak pressure for image formation, the image forming member is affected by irregularities on the image formation table due to errors of finishing of the table. Accordingly, in an extreme case, the knife will spring up and normal cutting will not be carried out.

SUMMARY OF THE INVENTION

Therefore, an object of the present invention is to attain stable landing of an image forming member of an image forming member drive device of an automatic drawing apparatus.

Another object of the present invention is to stably fix a position where an image forming member is to be stopped after the lowering speed thereof is reduced in an image forming member drive device of an automatic drawing apparatus.

Still another object of the present invention is to effect an easy adjustment of an image forming member drive device of an automatic drawing apparatus.

A further object of the present invention is to press an object with a desired pressure in an image forming member drive device of an automatic drawing apparatus.

A still further object of the present invention is to avoid the influence of irregularities of an image formation table when an image is formed with a very slight pressure in an image forming member drive device of an automatic drawing apparatus.

In order to accomplish the above described object, an image forming member drive device of an automatic drawing apparatus according to the present invention includes: a table on which an object of image formation is to be placed; an image forming member disposed over the table for forming an image on the object; a vertical drive connected to the image forming member for driving the image forming member vertically; a position detector for detecting the vertical position of the image forming member; and a position controller for controlling the vertical position of the image forming member in response to an output signal of the position detector. Consequently, the vertical position of the image forming member is detected and, in response to the detection signal, a closed loop circuit control is effected so that the image forming member stops at a prescribed position. As a result, the image forming member in the image forming member drive device of the automatic drawing apparatus can be landed stably.

According to a preferred embodiment of the invention, the vertical drive device for the image forming member includes: a first current generator for generating a first current in response to the output signal of the position detector, a first magnetic field generator connected to the image forming member, for generating a magnetic field in response to the first current, and a second magnetic field generator provided to guide the first magnetic field generator.

The image forming member is driven by the mutual reaction of the magnetic fields generated by the first and second magnetic field generators.

According to a further preferred embodiment of the invention, in the image forming member drive device constructed as described above, the image forming member is driven only by controlling the current flowing in the first magnetic field generator and the driven amount is defined by the output signal of the position detector. Accordingly, in the image forming member drive device, the position of the image forming member can be controlled easily.

According to a further preferred embodiment of the invention, the image forming member drive device further includes a pressure signal output device for outputting a pressure signal for pressing the object on the table, a second current generator for generating a second current in response to the pressure signal, a third magnetic field generator connected to the image forming member, for generating a magnetic field in response to the second current, and a fourth magnetic field generator provided to guide the third magnetic filed generator, and the image forming member presses the object by mutual reaction of the magnetic fields generated by the third and fourth magnetic field generators.

According to a further preferred embodiment of the invention, the image forming member drive device is thus constructed and, accordingly, a pressure signal and a pressing force corresponding thereto can be easily obtained. As a result, in the image forming member drive device, the object can be pressed with a desired pressing force by controlling the pressure signal.

According to a further preferred embodiment of the invention, the vertical drive device for the image forming member further includes a damping device for damping the effect of the contacting of the image forming member with the object of image formation.

Since the image forming member drive device is thus constructed, the effect of the impact force is reduced even if the image forming member contacts the image formation table abruptly. Accordingly, in the image forming member drive device, even if an image is formed with a very small pressure, the image forming member is not affected by irregularities in the image formation table.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
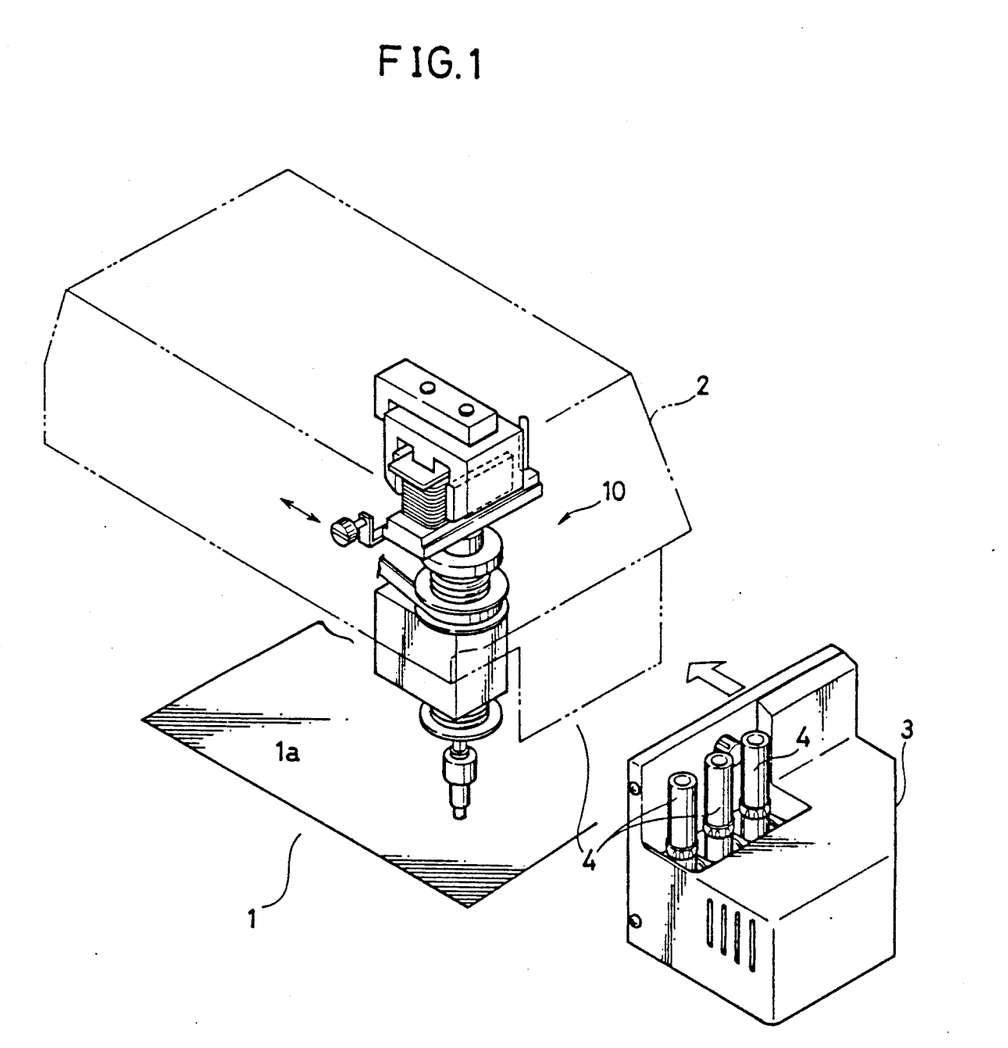
FIG. 1 is a perspective view of an image forming head of an image forming member drive device according to the present invention.

FIG. 1 is a perspective view of an image forming head to which an image forming member drive device according to the present invention is applied, and portions related thereto. Referring to FIG. 1, an automatic drawing apparatus including the image forming member drive device according to the present invention comprises an image formation table 1, an image forming head 10 for image formation on an image formation sheet 1a placed on the image formation table 1, a support 2 for supporting the image forming head 10, and an image forming kit 3 provided detachably on the support 2, for holding a plurality of pens 4 selectively used by the image forming head 10.

To form an image, the image forming head 10 is supported by the support 2 and is moved to a desired position. When the pen attached to the image forming head 10 is to be replaced, another pen 4 held in the image forming kit 3 is attached to the image forming head 10.

Figure 2:
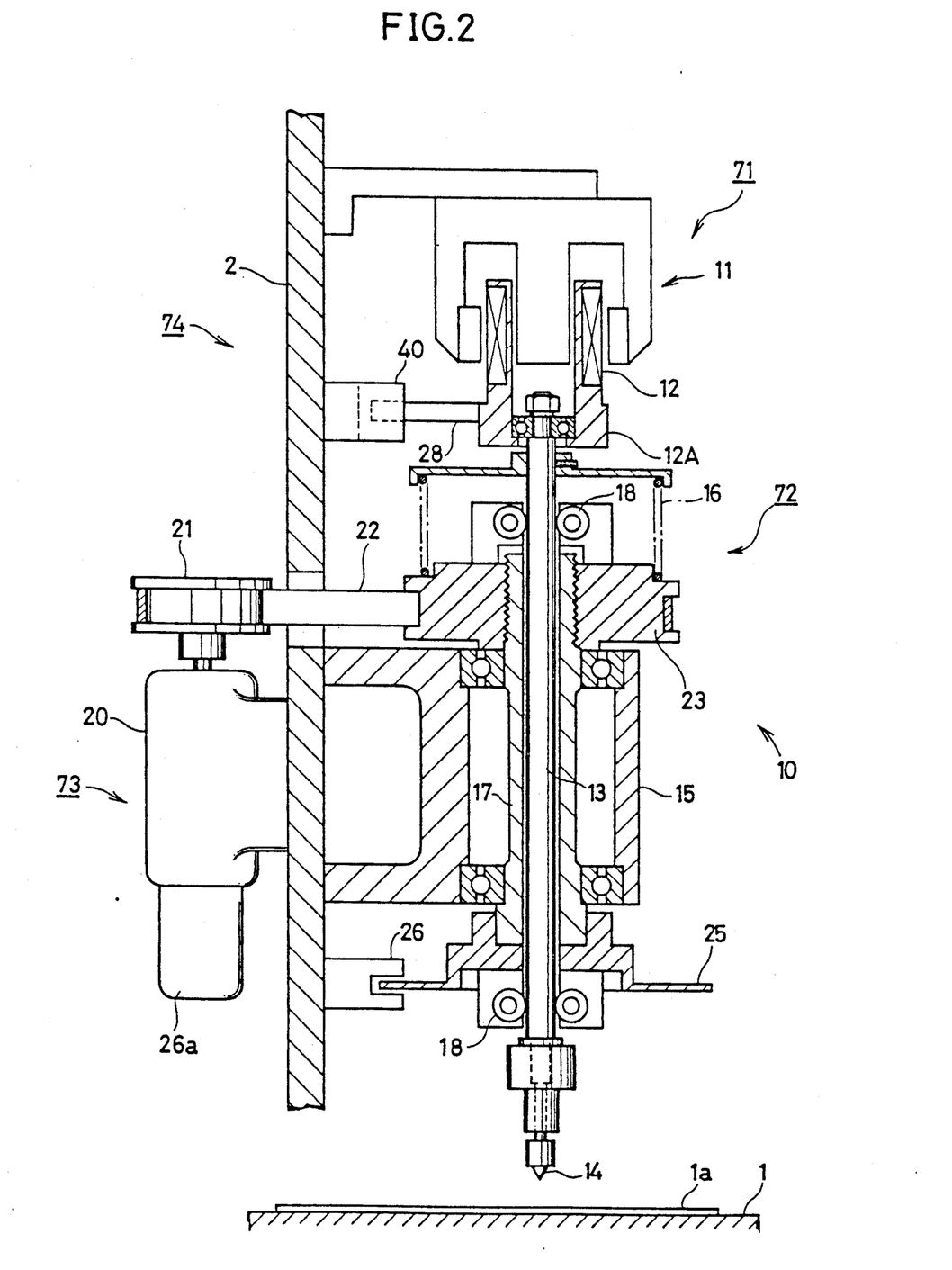
FIG. 2 is a sectional view of the image forming head.

FIG. 2 is a sectional view of a main part of the image forming head 10 shown in FIG. 1. Referring to FIG. 2, the image forming head 10 to which the present invention is applied comprises an image forming member 14, a drive portion 71 for driving the image forming member 14 vertically, and a support portion 72 for supporting the drive portion 71 are for moving it in the vertical direction. The drive portion 71 comprises a coupling shaft 13 for supporting the image forming member 14, a moving coil 12 connected to the coupling shaft 13, and a permanent magnet 11 for driving the moving coil 12. The support portion 72 comprises a support bracket 15 for supporting the coupling shaft 13 so that it is movable in the vertical direction and rotatable in the horizontal direction, a support spring 16 for elastically supporting a movable portion including the moving coil 12, the coupling shaft 13 and the image forming member 14, a cylindrical shaft 17 provided in the support bracket 15 and located rotatably around the coupling shaft 13, and guide rollers 18 for supporting the coupling shaft 13 to move in the vertical direction.

A rotor 73 for the image forming member comprises a drive motor 20 for driving and rotating the image forming member 14, a drive pulley 21 provided at an output shaft of the drive motor 20, for transmitting an output of the drive motor 20, a transmission pulley 23 for rotating the coupling shaft 13, a transmission endless belt 22 engaged with the drive pulley 21 and the transmission pulley 23, for transmitting the driving force of the drive motor 20 to the coupling shaft 13, a rotation point detector 26 for detecting rotation of a rotating member 25 provided on the cylindrical shaft 17, and a rotation position detector 26a connected to the drive motor 20 for detecting the rotational position of the drive motor 20.

A vertical position detecting portion 74 for detecting a vertical position of the image forming member 14 is provided on the support 2. The vertical position detecting portion 74 includes a slit plate 28 on a bobbin support 12a of the moving coil 12, and a vertical position detector 40 for detecting the position of the slit plate 28. The vertical position detector 40 is formed by an infrared light emitting diode and a photodiode.

Referring to FIGS. 1 and 2, the operation of the image forming head 10 will briefly described as follows. When a signal is provided from a control device of the image forming member drive device (to be described) to begin to form an image, the image forming head 10 is moved to a predetermined position. At first, the image forming member 14 is positioned over the image formation sheet 1a. In response to an image formation signal, current flows in the moving coil 12 of the drive portion 71. As a result, the moving coil 12 is driven downward. In consequence, the image forming member 14 is driven downward and it stops at a predetermined position above the image formation table 1. The image forming member 14 is biased upward inherently by the support spring 16 through the coupling shaft 13. Accordingly, when the moving coil 12 is driven downward, the image forming member 14 is driven downward against the force of the support spring 16.

After the image forming member 14 contacts the image formation sheet 1a, the permanent magnet 11 drives the moving coil downward so that the image formation sheet 1a is pressed by the image forming member 14 with a prescribed force.

Figure 3:
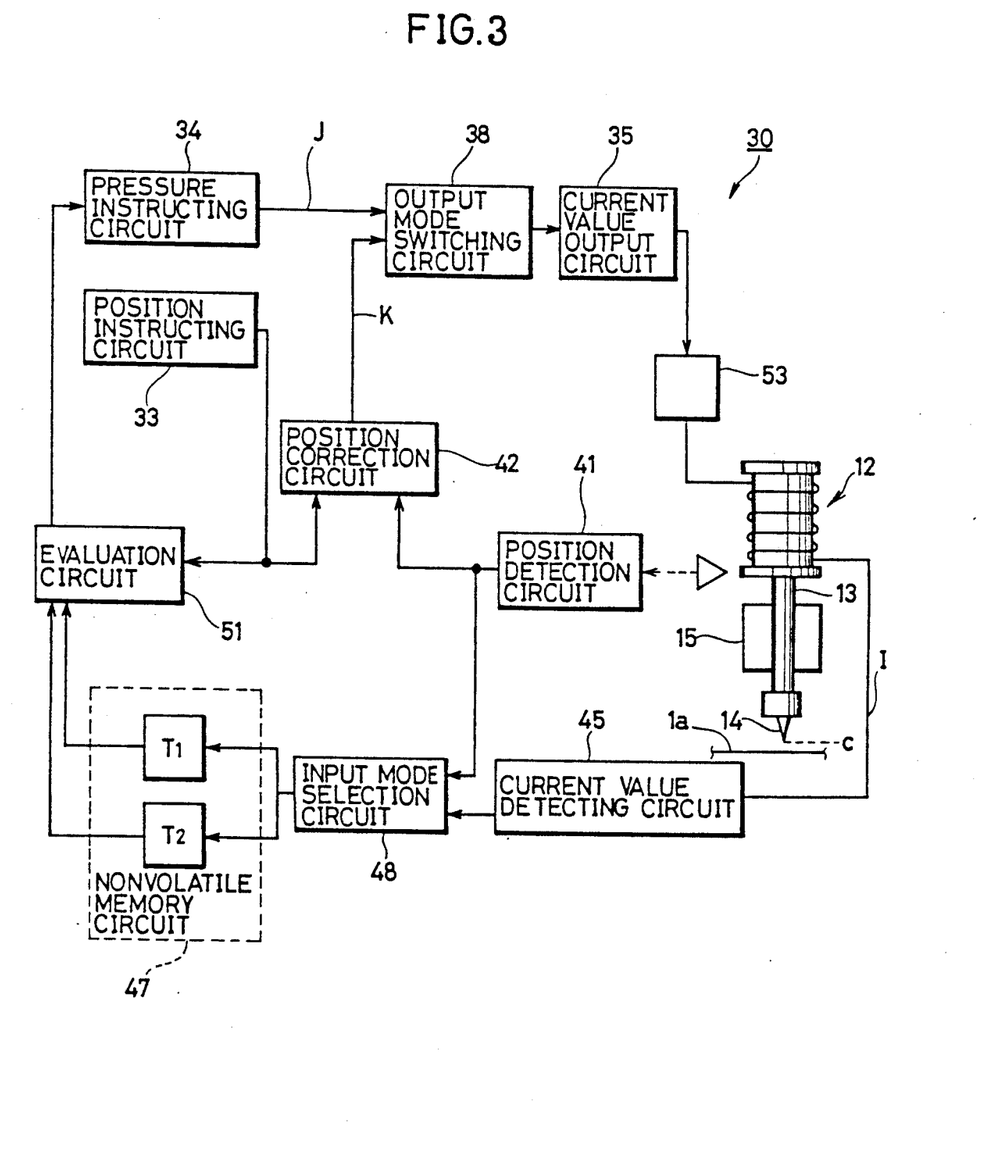
FIG. 3 is a block diagram showing control circuits of the image forming member drive device according to the present invention.

FIG. 3 is a functional block diagram which is usable for explaining the operational principle of a control portion for controlling the drive portion 71 of the image forming head according to the present invention. Referring to FIG. 3, the control portion moves the image forming member 14 when a predetermined current flows in the moving coil 12 of the image forming head and detects the position of the moved image forming member 14. The control portion further includes a current value control circuit 30 for providing a feedback signal based on the detection signal of the position of the image forming member 14 to position the image forming member 14 reliably. The control portion further includes a pressing force control circuit 70 which stores data defining a relation between a pressing force applied to the object 1a and a value of current flowing in the moving coil 12 after the image forming member 14 contacts the object 1a and which also controls the pressing force of the image forming member 14 in an open loop manner by causing a current of a predetermined value to flow in the moving coil 12 of the image forming head according to the stored value.

The current value control circuit 30 comprises a position instructing circuit 33 for instructing raising or lowering to desired degrees of the image forming member 14 based on preset procedures, a pressure instructing circuit 34 for setting a pressure for image formation of the image forming member 14, a current value output circuit 35 for outputting a needed coil current value based on the instruction signals from the two instructing circuits, a position detecting circuit 41 for detecting the raised or lowered position of the image forming member 14, and a position correcting circuit 42. A closed loop control circuit is formed by the position detecting circuit 41, the position instructing circuit 33, the position correcting circuit 42 and the current value output circuit 35 until the image forming member 14 attains the prescribed stop position.

The pressing force control circuit 70 comprises a current value detecting circuit 45 for detecting the value of current flowing in the moving coil 12 of the image forming head in response to the pressure for image formation outputted from the pressure instructing circuit 34, a nonvolatile memory circuit 47 for storing in advance a relation between the pressure for image formation instructed by the pressure instructing circuit 34 and the value of the current flowing in the moving coil 12 at that time, and an evaluation circuit 51 for evaluating a value of current to flow in the moving coil 12 of the image forming head based on the data stored in the nonvolatile memory circuit 47. When the pressure for image formation with respect to the object 1a of image formation is provided from the pressure instructing circuit 34, the pressing force applied to the object 1a by the image forming member 14 is controlled in an open loop based on the relation between the pressure and the value of current flowing in the moving coil, that information being stored in advance in the nonvolatile memory 47.

Thus, the functional block diagram was described by using the circuit diagram which represents the principle for controlling the drive portion 71 of the image forming head according to the invention. Next, an embodiment of the image forming member drive device of the automatic drawing apparatus using this principle is described.

Figure 4:
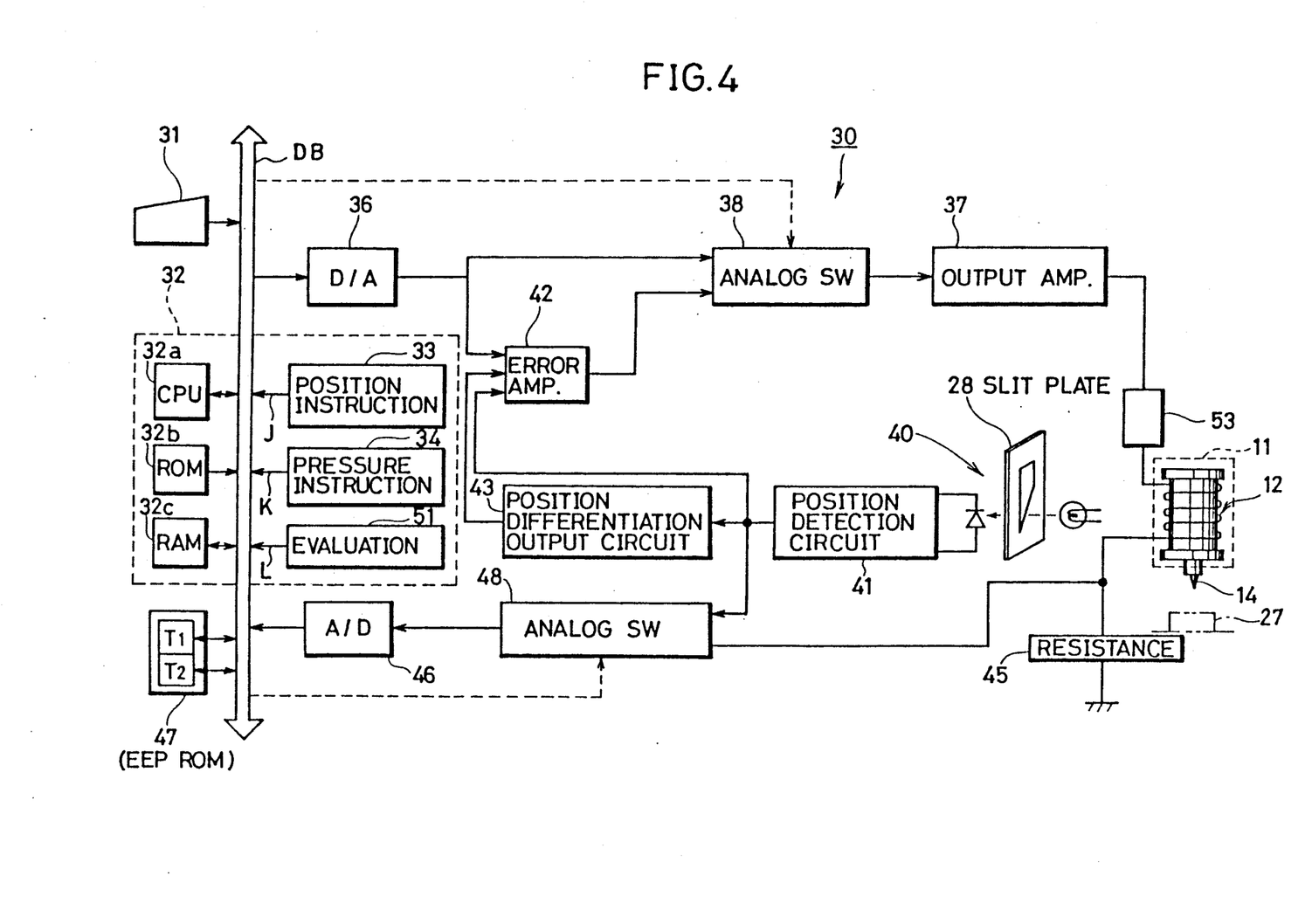
FIG. 4 is a diagram showing an example of control of an image forming member drive device of an automatic drawing apparatus according to the present invention.

FIG. 4 is a diagram of an embodiment of the image forming member drive device controller which is based on the operational principle which is shown in FIG. 3. Referring to FIG. 4, the image forming member drive device controller according to the present invention comprises a control portion 32 for generally controlling the drive of the image forming member 14, an input device 31 connected to the control portion 32 through a data bus DB, a D/A converter 36 connected to the data bus DB, for converting an output signal from the control portion 32 to an analog signal, an output mode switching circuit 38 formed by an analog switch for switching an output mode according to the signal of the control portion 32, an output amplifier 37 connected to the output mode switching circuit 38, a damping circuit 53 connected to the output amplifier 37 for suppressing vertical movement of the image forming member 14, a current value detecting circuit 45 for detecting the current flowing in the moving coil 12 which circuit is connected to the image forming member 14, an input mode selection circuit 48 connected to the current value detecting circuit 45, for selectively inputting any of signals from the position detecting circuit 41 which detects the value of current flowing in the moving coil 12 or detects the vertical direction of the image forming member 14, an A/D converter 46 connected to the input mode selection circuit 48, for converting a signal inputted to the input mode selection circuit 48 to a digital signal and inputting the same to the data bus to input it in the control portion 32, a position differentiation output circuit 43 connected to the position detecting circuit 41, for slowing down the raising or lowering speed of the moving coil 12, and a position correcting circuit 42 connected to the position differentiation output circuit 43. The D/A converter 36 and the output mode switching circuit 38, and a nonvolatile memory circuit 47 are connected to the control portion 32 through the data bus DB, for storing a position current corresponding value table T1 described in detail later and a pressure current corresponding value table T2 are also present.

The control portion 32 is formed by a microcomputer and comprises a CPU 32a. It also comprises a ROM 32b, a RAM 32c, a position instructing portion 33 for setting the position of the image forming member 14 is connected to the CPU 32a or the like through the data bus DB. A pressure instructing portion 34 is included for setting a pressure applied to the image formation table of the image forming member 14, and an evaluation portion 51 is present for evaluating a pressure corresponding value at the time of switching of the output mode.

The position instructing portion 33 outputs a position instructing signal based on a program stored in advance in the ROM 32b (for example concerning a change of current value according to the coil current (I) represented by Ia and Ib shown in FIG. 5, which will be described later) so as to control the lowered position of the image forming member 14.

The pressure instructing portion 34 outputs a pressure instructing signal K in a pressure control mode M2 described later, so that image formation is effected with the designated pressure P1 inputted through the input device 31.

The current output circuit 35 outputs a necessary coil current value I upon receipt of the instruction signals J and K from the position instructing portion 33 and the pressure instructing portion 34, respectively. The D/A converter 36 is controlled by an 8-bit signal and the raised or lowered position of the image forming member 14 is controlled to a resolution of 30 μm. If the image forming member 14 is a cutting knife, it is controlled with a resolution having a cutting pressure of several grams.

Figure 5:
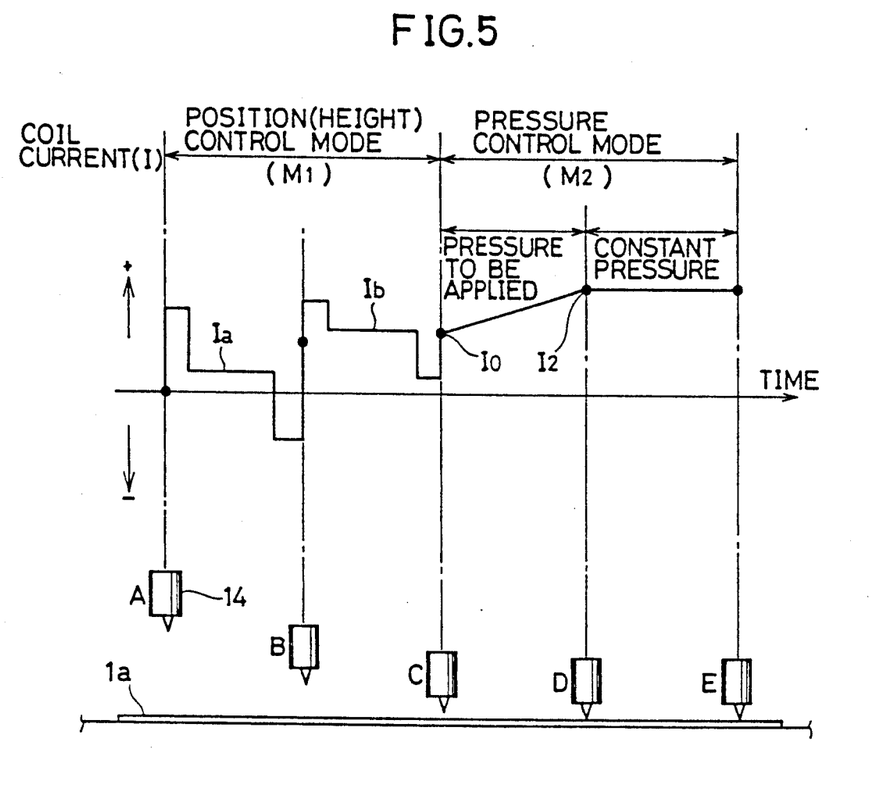
FIG. 5 is a graph for explaining a relation between a current value of a coil connected to the image forming member and a lowered position of the image forming member corresponding thereto.

The output mode switching circuit 38 is formed by an analog switch and it switches the output mode to a pressure control mode M2 upon determining that the image forming member 14 attains a decelerated lowered position C shown in FIG. 5 after a prescribed time after a signal level from the D/A converter 36 reaches a preset signal level.

The position detecting circuit 41 outputs the current value outputted from the raised or lowered position detector 40 shown in FIG. 2 as a signal corresponding to the raised or lowered position of the image forming member 14 in analog form.

The position correction circuit 42 is formed by an error amplifier which compares the output signal from the position detecting circuit 41 to the level of the position instructing signal from the D/A converter 36 and outputs an error signal to the output mode switching circuit 38. The position detecting circuit 41 is provided with a position differentiation output circuit 43 for damping the raising or lowering speed of the moving coil 12, so that the output signal therefrom is inputted to the error amplifier 42.

The nonvolatile memory circuit 47 sets and stores in data tables the position/current corresponding values and pressure/current corresponding values described later. This circuit 47 is formed by an EEPROM (Electrically Erasable and Programable Read Only Memory).

The input mode selecting circuit 48 is formed by an analog switch. It sets and inputs data tables T1 and T2 described below into the nonvolatile memory circuit 47.

The data set in the data tables T1 and T2 are inputted to the nonvolatile memory circuit 47 through the 8-bit A/D converter 46.

Referring to FIG. 4, in the position control mode M1, a closed loop control circuit is formed by the position detecting circuit 41, the position instructing portion 33, the position correction circuit 42 and the current value output circuit 35 and the lowering operation of the image forming member 14 is controlled as shown by A to C in FIG. 5. In order to execute the control, the coil current value I is controlled as Ia to Ib based on the preset program.

Referring now to FIG. 5, description is made of the relation between the value of current flowing in the moving coil 12 and the position of the image forming member 14 controlled thereby is explained.

The control device of the image forming member drive device has two modes, i.e., a position control mode M1 and a pressure control mode M2. In the position control mode M1, a closed loop circuit is formed in which the position of the image forming member 14 is detected and the signal is fed back to control the position. In the pressure control mode M2 for controlling the pressing force applied to the image formation sheet by the image forming member 14, an open loop control based on control is established of the current value of the moving coil.

Referring to the left side of the graph of FIG. 5, the coil current I of the moving coil 12 in the position control mode M1 and the positional relation of the image forming member 14 corresponding thereto are shown. The image forming member 14 is maintained at an initial position A (i.e., a state at which it is supported by the elastic spring 16) before turn-on of the power supply. Then, the image forming member 14 is lowered at high speed to a waiting position B after the turn-on of the power supply. Subsequently, the image forming member 14 is accelerated and lowered upon receipt of the image formation start signal and before it reaches the surface of the image formation sheet 1a, it is temporarily decelerated and stopped. The stop position C after the deceleration is set to a value so that the tip of the cutter knife 14 is maintained at a position of about 0.8 mm above the surface of image formation, for example.

The current value I is defined by detecting the value of current flowing the coil shown in FIG. 4 by the current detecting circuit 45.

As described above, according to the present invention, the closed loop circuit is formed and the coil current value is controlled in the position control mode M1 until the image forming member 14 is decelerated and stopped. Consequently, the image forming member 14 is positioned at high speed and accurately at the stop position C. After that, the open loop circuit is formed and the coil current value is controlled in the pressure control mode M2. Since the stop position C is selected as a position close to the image formation sheet, the image forming member 14 can be landed smoothly and stably on the image formation sheet.

Next, setting and inputting of the data tables is described.

Figure 6:
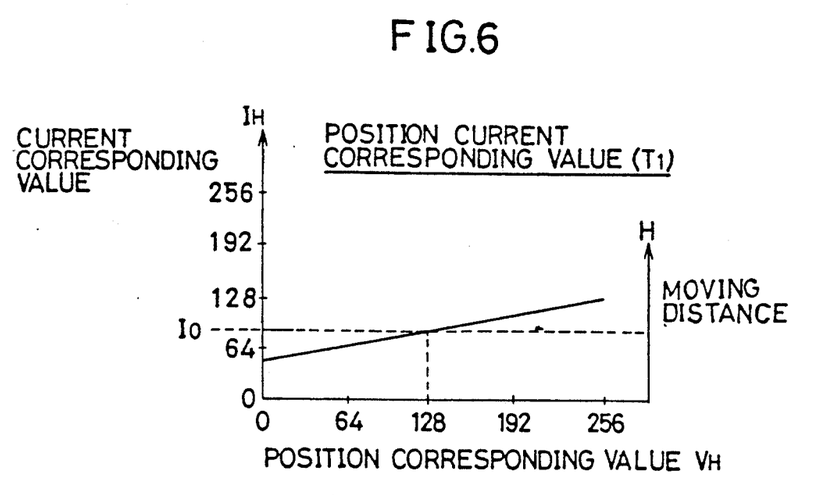
FIG. 6 is graph showing a relation between a signal value corresponding to the position of the image forming member and a corresponding current value of a moving coil corresponding to the position.

FIG. 6 shows a relation between the moving distance (corresponding to raised or lowered position) of the image forming member 14 and the current value of the moving coil 12, that is, the position current corresponding value table T1. This data table T1 is set and inputted to the nonvolatile memory circuit 47 in the following manner.

First, a position input mode is selected by the mode selector of the input device 31. Then, the output mode switching circuit 38 sets the position control mode M1 and the other input mode selection circuit 48 sets the current value input mode. As a result, a closed loop control circuit is formed by the control portion 32, the D/A converter 36, the error amplifier 42, the output mode switching circuit 38, the output amplifier 37 and the position detecting circuit 41, while a learning circuit is formed by the current value detecting circuit 45, the input mode selection circuit 48, the A/D converter 46 and the nonvolatile memory circuit 47.

Next, the signal level (position corresponding to value $V_H$) from the D/A converter 36 increments by one from 0 in response to the instruction signal from the position instructing portion 33 of the control portion 32. In response thereto, the moving coil 12 is lowered against the force of spring 16. The current value of the moving coil 12 at this time is read as the corresponding current $I_H$ through the A/D converter 46. Learning is effected by executing this procedure for all raised and lowered position of the image forming member 14. In this manner, the position current corresponding value table T1 is inputted to the nonvolatile memory circuit 47.

Referring now to the right side of FIG. 5, the coil current I in the pressure control mode M2 means the position of the image forming member 14 will be described. Further referring to FIG. 7 the pressure/current value table T2, involved in setting the pressure of the image forming member 14 in the pressure control mode M2 will be described.

Figure 7:
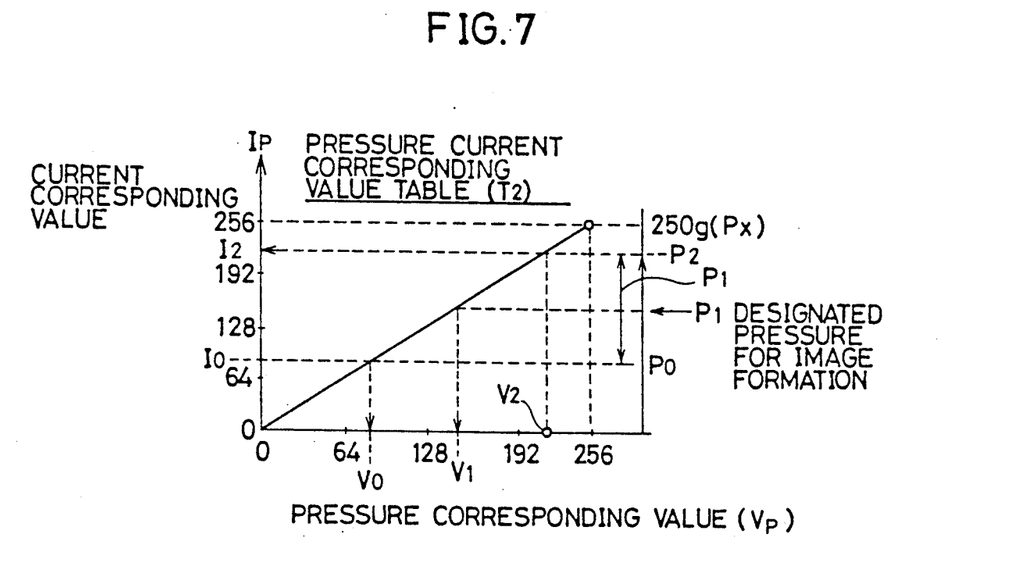
FIG. 7 is a graph showing a relation between a pressure value when the image forming member presses the image formation table and a current value in the moving coil.

FIG. 7 shows the relation between the pressure P of image formation of the image forming member 14 and the current value of the moving coil 12, that is, the pressure/current value table T2. This data table T2 is inputted to the nonvolatile memory circuit 47 in the following manner.

The pressure input mode is selected by the mode selector provided in the input device in the same manner as described previously. The output mode switching circuit sets the pressure control mode M2 and the other input mode selection circuit 48 maintains the current value input mode. Then, a learning circuit is formed by the control portion 32, the D/A converter 36, the output mode switching circuit 38, the output amplifier 37, the current value detection circuit 45, the input mode selection circuit 48, the A/D converter 46 and the nonvolatile memory circuit 47.

Subsequently, in response to the instruction signal from the pressure instructing portion 34, the level (the pressure corresponding value $V_P$) of the output signal from the D/A converter 36 is incremented by one from 0 in the same manner as described previously. In response thereto, the pressure of image formation of the moving coil 12 increases. The coil current value at this time is read as the current corresponding value $I_P$ through the A/D converter 46. The relation between each pressure value $V_P$ and the corresponding current value $I_P$ is learned for all pressure values $V_P$ up to the maximum value 256 which is represented by 8 bits. As a result, the pressure/current value table T2 is developed and inputted into the nonvolatile memory circuit 47.

If a plural number of such tables T2 (for example, for low pressure, medium pressure and high pressure) are prepared by changing the gain of the output amplifier 37, the table T2 can be suitably utilized according to particular purposes e.g. cutting or marking off. Before the tables T2 are prepared, the gain of the output amplifier 37 is finely adjusted so that the output of the pressure indicator 27 (as shown in FIG. 4) with the maximum pressure corresponding value $V_P$ is a reference pressure value $P_X$. In the case of cutting, the table T2 is prepared so that the peel off film is cut with a pressure of about 10 g to 20 g. Then, the input mode is terminated.

The evaluation portion 51 evaluates and sets and data in the data tables T1 and T2 so that the value I of current flowing into the moving coil 12 at the time of switching of the output control mode from the position control mode M1 to the pressure control mode M2 would not jump or be discontinuous.

When the image forming member 14 reaches the stop position C in FIG. 5, that is, at the end of the position control mode M1, a required current value $I_0$ is calculated with reference to the data table T1 based on the position instruction from the position instructing circuit 33. Then, based on the corresponding current value $I_0$, a required specified corresponding pressure value V0 is calculated with reference to the table T2 based on the corresponding current value I0. This specified corresponding pressure value V0 corresponds to a signal level equivalent to the pressure P0 required for maintaining the image forming member 14 at the stop position C to counteract to the support spring 16.

On the other hand, the designated pressure P1 of image formation preset in the input device 31, the corresponding pressure value V1 corresponding thereto is calculated with reference to the data table T2. This corresponding pressure value V1 and the above mentioned specified corresponding pressure value V0 are added and the added corresponding pressure value V2 is outputted to the pressure instructing portion 34. Thus, the evaluation is completed.

After an elapse of a predetermined time (t) after the image forming member 14 reaches the stop position C, an output mode switching signal is provided from the CPU 32a so that switching is effected by the output mode switching circuit 38 from the position control mode M1 to the control mode M2. At this time, corresponding current value for the moving coil 12 is maintained at the fixed value I0 irrespective of the switching of the control mode. Accordingly, no vertical fluctuation of the image forming member 14 or erroneous setting of its height occurs.

After that, the corresponding current value for the moving coil 12 is increased gradually until it attains the current value I2 which corresponds to the above mentioned added corresponding pressure value V2 inputted to the pressure instructing circuit 34. As a result, the image forming member 14 is gradually lowered from the temporary stop position C so that it soft-lands on the surface of the image formation sheet 1a. On this occasion, the pressure applied to the image forming member 14 increases gradually until it changes from 0 to the designated pressure P1 for image formation. After the image forming member 14 reaches the soft-landing point D, image formation is effected with the prescribed designated pressure P1 of image formation.

As described above, in the preferred embodiment of the invention, corresponding values between the position and current of the moving coil 12 and between the pressure the current are stored as data tables in advance in the nonvolatile memory circuit 47, through a learning process. When the position control mode M1 switches to the pressure control mode M2, the above mentioned data tables are referred to through the evaluation portion 51 and the specified corresponding value V0 of the image forming member 14 and the required image formation corresponding pressure value V1 are calculated so that those values are added to obtain the added corresponding output value V2.

The specified corresponding pressure value V0 corresponds to the signal level equivalent to the pressure P0 required for maintaining the image forming member 14 at the stop position C to counteract the entire support system including the moving coil, the coupling shaft and the image forming member. The prescribed corresponding image formation pressure value V1 corresponds to the signal level equivalent to the pressure P1 required for image formation a maintained state.

The coil current value is controlled through the pressure instructing circuit 34 and the current value output circuit 35 based on the above mentioned specified corresponding pressure value V0 and added corresponding pressure value V2. When the image forming member 14 moves from the stop position C and is soft-landed, the image formation pressure increases from 0 to the prescribed image formation pressure P1. As a result, even if the characteristics of the entire support system for the image forming member, the position detector, the output amplifier and the like differ for each apparatus, individual fine adjustment is not required. Particularly, at the time of switching of the output mode, the image forming member does not sway or become unstable and thus the image forming member is controlled smoothly.

Next, a further preferred embodiment of the invention is described. In this embodiment, the image forming member drive device includes a damping circuit 53 as shown in FIG. 3.

The damping circuit 53 is effectively utilized in the case of cutting a peel off film using a knife as the image forming member for example when the knife is operated with very low pressure. More specifically, when the knife is run with a very low pressure, the knife might jump up due to irreguralrities caused by an error in lowering the same onto the image formation table. Therefore, in order to avoid this, the damping circuit 53 is provided, comprises a resistance circuit with a resistance value which can be adjusted. More specifically, in the damping circuit 53, the output impedance of the output amplifier 37 is set to a sufficiently low value so that current caused by counter-electromotive force of the moving coil 12 is controlled. As a result, the knife 14 can be prevented from up.

Figure 8:
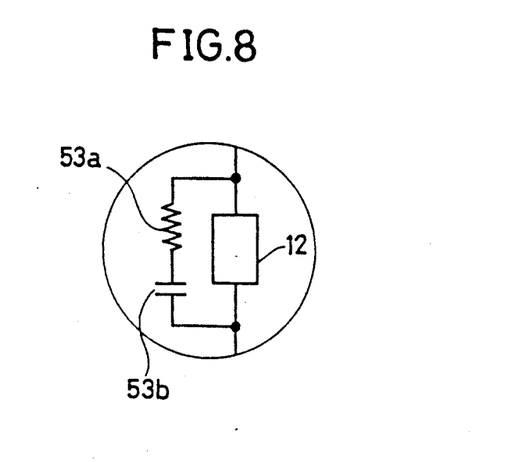
FIG. 8 is a circuit diagram of a main component of an exemplary damping circuit.

FIG. 8 is a circuit diagram showing a variant of the damping circuit 53. Referring to FIG. 8, a series damping circuit is provided which comprises a resistor 53a and a capacitor 53b in parallel with the moving coil 12, and, in such a case, the same effect can be obtained. In this case, only a high-frequency component of the counter-electromotive force is absorbed. Accordingly, the knife 14 runs along the irregularities on the image forming table.

The present invention is not limited to the above described embodiments and it goes without saying that various variants may be adopted.

As is understood from the foregoing, according to the present invention, a closed loop circuit is formed and the coils current magnitude is controlled in the position control mode until the image forming head attains the stop position. Accordingly, the image forming member can be soft-landed smoothly and stably on the image material as compared to conventional image forming control devices.

According to the first preferred embodiment, fluctuation of the coil current value prevented based on the data tables learned in advance, when the output mode switches from the position control mode based on the closed loop to the pressure control mode based on the open loop. As a result, it is not necessary to take any account of irregularities in characteristics of the elements of the support system and the control circuit at the stop position of the image forming member while maintaining stability at the stop position. Accordingly, the control device for the whole drive device can be adjusted easily.

According to the second preferred embodiment, the damping circuit of the simple construction is provided in the control circuit of the image forming member drive device and accordingly stable running of the image forming member is ensured without being adversely affected by irregularities on the image formation table.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A drive device for an image forming means, comprising:
   means for holding an object which is associated with the formation of an image forming means for forming an image,
   image forming means for forming an image on the object;

drive means connected to said image forming means for driving said image forming means vertically, position detecting means for detecting a vertical position of said image forming means, and position control means for controlling the vertical position of said image forming means in response to an output of said position detecting means;

said drive device further includes pressure signal output means for outputting a pressure signal for controlling a pressure exerted by said image forming means on said means, said drive means further including:

second current gathering means for generating a second current in response to said pressure signal, third magnetic field generating means connected to said image forming means, for generating a magnetic field responsive to said second current; and fourth magnetic field generating means for guiding said third magnetic field generating means, and wherein said image forming means is effective for pressing on said object by the mutual reaction of the magnetic fields generated by said third and fourth magnetic field generating means.

2. The drive device of claim 1, wherein
said third magnetic field generating means generates a second magnetic field proportional to said second current.

3. The drive device of claim 2, wherein
said third magnetic field generating means includes an electromagnetic coil, and
said fourth magnetic field generating means includes a permanent magnet.

4. The drive device of claim 3, wherein
said position control means includes second current value detecting means for detecting a value of said second current.

5. The drive device of claim 4, wherein
said drive device further includes second storing means
for storing a relation between a pressing force corresponding to said pressure signal and the value of said second current corresponding to said pressing force.

6. The drive device of claim 5, wherein
said drive device further includes pressing force input means for inputting a desired pressing force for pressing on said object, and
said image forming means drive means is effective for pressing on said object with said desired pressing force according to the relation between said pressing force and said second current value stored in said second storing means.

7. The drive device of claim 1, wherein
said drive means further includes damping means for damping the effect of a contact being established between said image forming means and said object.

8. The drive device of claim 7, wherein
said damping means is effective for absorbing a counter-electromotive force generated in said third magnetic field generating means.

9. The drive device of claim 8, wherein
said damping means includes a series connection of a resistance and a capacitance which resistance and capacitive are connected in parallel with said third magnetic field generating means.

* * * * *

UNITED STATES PATENT AND TRADEMARK OFFICE
CERTIFICATE OF CORRECTION

PATENT NO. : 5,042,155
DATED : August 27, 1991
INVENTOR(S) : Masaki YOSHIOKA et al.

It is certified that error appears in the above-indentified patent and that said Letters Patent is hereby corrected as shown below:

Col. 13, line 13, delete "second"; change "gathering" to --generating--; and delete "sec-";
      line 14, delete "ond";
      line 15, change "third" to --first --;
      line 17, delete "second";
      line 18, change "fourth" to --second--;
      line 19, change "third" to --first--;
      line 22, change "third" to --first--;
      line 23, change "fourth" to --second--;
      line 25, change "third" to --first--;
      line 26, delete "second";
      line 29, change "third" to --first--; and
      line 31, change "fourth" to --second--.

UNITED STATES PATENT AND TRADEMARK OFFICE
CERTIFICATE OF CORRECTION

PATENT NO. : 5,042,155
DATED : August 27, 1991
INVENTOR(S) : Masaki YOSHIOKA et al.

It is certified that error appears in the above-indentified patent and that said Letters Patent is hereby corrected as shown below:

```
Col. 14,   line 1,    change "second" to --a--;
           line 3,    delete "second";
           line 5,    change "second" to --a--;
           lines 6-7, delete paragraph spacing;
           line 9,    delete "second";
           line 18,   delete "second";
           line 19,   delete "second";
           line 26,   change "third" to --first--; and
           line 31,   change "third" to --first--.
```

Signed and Sealed this

Seventh Day of November, 1995

Attest:

BRUCE LEHMAN

*Attesting Officer*   Commissioner of Patents and Trademarks